June 30, 1936. L. C. MARTIN 2,045,916
OPHTHALMIC MOUNTING
Filed July 27, 1934

Inventor:
Laurence C. Martin
By Pennington and White
Attorneys.

Patented June 30, 1936

2,045,916

UNITED STATES PATENT OFFICE 2,045,916

OPHTHALMIC MOUNTING

Laurence C. Martin, Providence, R. I., assignor to Martin-Copeland Company, Providence, R. I., a trusteeship consisting of Edgar W. Martin, Laurence C. Martin, and George W. Bleecker Application July 27, 1934, Serial No. 737,221

1 Claim. (Cl. 88—53)

This invention relates to ophthalmic mountings and particularly to improvements in the means for securing the split rims of spectacles to the lenses and for connecting the temples therewith.

One object of the invention is to provide a device whereof the split rims may be secured in firm engagement with the lenses and the temples pivotally connected thereto to provide for disconnecting the rims to remove the lenses without disturbing the temple connections; and vice versa, to provide for removing and replacing the temples without disturbing the connection of the split rims which secures them to the lenses.

Another object of the invention is to provide a device of the type indicated permitting easier and more convenient assembly of the spectacle rims with the lenses and mounting the temples thereon, and one wherein variations in the size of the lenses is compensated for in the attaching means without tending to loosen or in any way affect the temple mounting.

Another object of the invention is to provide a device of the type indicated wherein the temple mounting is maintained with a snug fit to prevent the defect of "drop temple" caused by looseness in the joint during use of the spectacles.

Another object of the invention is to provide a device of the type indicated wherein the securing means for the split rims of the spectacles and the mountings for the temples are of neat and unobtrusive appearance without projections or sharp edges liable to scratch the face or injure the fingers of the wearer.

Another object of the invention is to provide a device of the type indicated which is adaptable for use with temples of standard form and shape without changes in their structure.

Further objects of the improvement are set forth in the following specification which describes a preferred embodiment of the invention, by way of example, as illustrated by the accompanying drawing. In the drawing.

Figure 1:
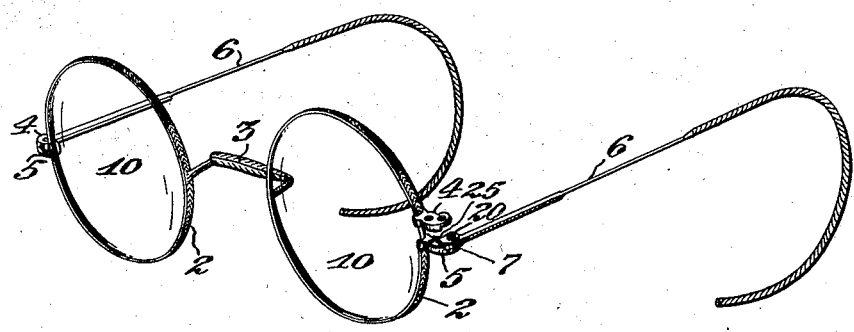
Fig. 1 is a perspective view of a pair of spectacles showing the present improved rim-securing device and temple-mounting means applied thereto with one of the split rims shown as sprung apart while the temple remains attached thereto.
Figure 3:
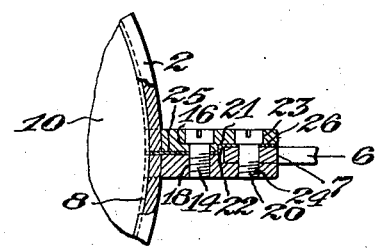
Fig. 3 is a sectional view on the line 3—3 of Fig. 2 looking in the general direction indicated by the arrows.
Figure 4:
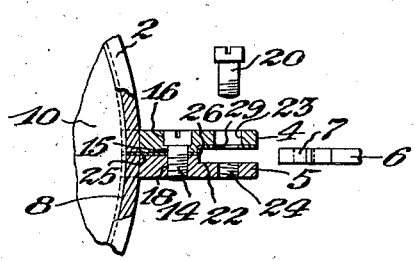
Fig. 4 is a similar sectional view showing the temple removed from its mounting and its pivot-screw withdrawn.

In the drawing, Fig. 1 illustrates a spectacle frame of conventional type comprising split rims 2 joined by a bridge member 3 and formed with mountings at the side for pivotally connecting the temples thereto. The rims 2 of the spectacle frame may be of generally circular or oval shape and, as shown in Figs. 3 and 4, the inner face of each rim is scored with a narrow groove 8 for receiving the peripheral edge of the lens 10. As in the usual construction the terminal portions of the divided rim 2 are provided with end-pieces 4 and 5 adapted to be drawn together by screws, rivets or other means to secure the rim in close fitting engagement with the periphery of the lens.

In a common form of construction of spectacle frames a screw is employed for drawing the ends of the rim together and a pin fast in one of the end-pieces serves as a pivot for the temple connection. With this form of construction the two end-pieces on the rim are maintained tight against the pivoted end of the temple by the screw which draws the ends of the rim together, but if the screw loosens, as often occurs from wearing and handling the spectacles, then the temple becomes loose and causes what is known as "drop temple" allowing the spectacles to tilt on the nose to thus throw the lenses out of proper axial adjustment. Moreover, with this previously used form of construction of the rim-securing means and temple mounting, when it becomes necessary to replace a broken temple with a new one the end-members of the lens rim must be separated, thus releasing the lens. After the broken temple has been replaced by a new one the lens must be refitted to the rim and unless extreme care is taken it may be set in the wrong position to interfere with the vision of the wearer.

In other cases, should the lens vary in diameter its proper fitting to the rim cannot always be accomplished; for example, should the lens be of less than the prescribed diameter it will be loose in the rim when the end-pieces of the latter are drawn together; while on the other hand, should it be too large for the rim the end-pieces cannot be drawn snugly into place and therefore the temple connection will be loose and shackly causing "drop temple".

To overcome the above noted defects and deficiencies of previously used ophthalmic mountings for spectacles the present invention provides a construction wherein the fastening means for the ends of the lens rim is entirely separate from and independent of the pivot mounting for the temple. Through this improvement the rims of the spectacles may be properly adjusted to the lenses to compensate for slight variations in the diameter of the latter without affecting the snug fit of the temple within its mounting. Moreover, the independent means for fastening the ends of the split rim and connecting the temple with its mounting provide for releasing the securing means for the rim to allow it to be sprung open to remove the lens without causing disconnection of the temple from its mounting; and vice versa, the temple may be removed from its mounting without disconnecting the ends of the rim so as not to disturb the mounting of the lens therein.

The above stated features of improvement are secured by constructing the end-pieces for the lens rim in a peculiar and novel manner as next described. Both end-pieces 4 and 5 are preferably of the same general shape, see Fig. 5, being disposed to extend laterally from the ends of the lens rim 2 with a generally curved contour terminating in a circular end. The upper end-piece 4 is adapted to overlie the lower end-piece 5 to be secured thereto by means of a screw 14. The screw 14 passes through a hole 15 in the upper end-piece 4, with a counterbore provided at 16 to receive the head of the screw whereby its top will be flush with the top of the end-piece; and the lower end-piece 5 has an axially alined hole 18 interiorly threaded to engage the threads on the screw.

Figure 2:
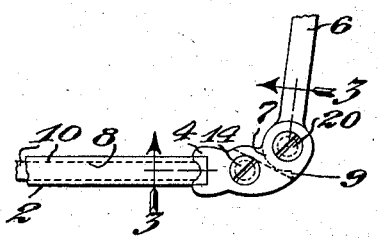
Fig. 2 is a plan view showing the general construction of the rim-securing means and temple mounting.

Outwardly beyond the holes for the screw 14 the two end-pieces 4 and 5 are provided with axially alined holes for another screw 20 which serves as the pivot for the temples 6. The upper end-piece 4 has a hole 23 which is of sufficient diameter to permit the head of the screw 20 to pass freely therethrough while the lower end-piece 5 is provided with an axially alining hole 24 threaded to receive the threads of the screw 20. The under side of the upper end-piece 4 is milled off or cut away at 21 and the lower end-piece 5 is similarly cut away on its upper side at 22 whereby to provide a space for the insertion of the end of the temple 6 between the two end-pieces in the fashion of a hinge. It will be noted that the cut-out portions of the two end-pieces 4 and 5 are biased or, in other words, the sides of the cuts extend at an angle as shown by the dotted line in Fig. 2. The end of the temple 6 has a head 7 of generally circular shape conforming to the circular ends of the end-pieces 4 and 5 with a shoulder or projection 9 at one side positioned to strike against the edge of the cut to limit the turning movement of the temple on its pivot.

Figure 6:
Fig. 6 is a perspective view of the shim or spacing member employed between the ends of the split rim.

As a further adjunct to the present form of construction, a thin plate or shim 25, shown in perspective view in Fig. 6, is inserted between the two end-pieces 4 and 5 before they are drawn into place to tighten the rim 2 against the edge of the lens. The plate or shim 25 has an outline corresponding to the marginal contour of the end-pieces 4 and 5 and is offset or folded at one end to locate its flat portions in two separate planes. The main portion of the plate or shim 25 is held between the main sections of the end-pieces 4 and 5, while its outer portion 26 is offset to locate it in an upper plane to underlie the bottom face of the cut-out portion of the upper end-piece 4. The head or bearing 7 of the temple 6 is inserted beneath the outer offset portion 26 of the shim 25 so that the latter overlies the top of the temple for a purpose as later explained. The shim 25 is provided with holes 28 and 29, the former adapted to register with the holes 15 and 18 to permit the screw 14 to pass therethrough and the latter arranged in axial alinement with the holes 23 and 24 to adapt the screw 20 to be inserted therethrough.

It is to be particularly noted that the outer hole 29 in the shim 25 is of a diameter substantially equal to that of the body of the screw 20 or, in other words, of somewhat less diameter than the head of the screw. This provides that when the screw 20 is inserted in place and screwed down into the hole 24 in the lower end-piece 5 the under side of its head will abut against the top of the shim 25 to tighten the latter against the upper face of the temple 6. Through this arrangement of the parts the shim 25 is held pressed against the top of the temple 6 with sufficient tension to maintain the joint tight at all times.

Figure 5:
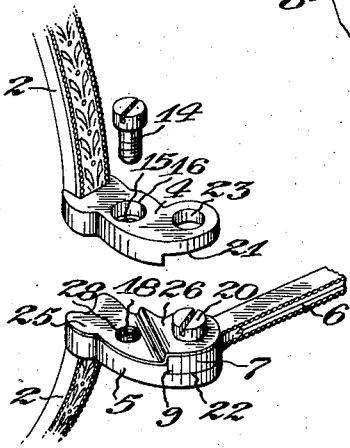
Fig. 5 is a perspective view illustrating the temple connected with its mounting and the split rim partially opened.

The parts of the spectacle frame may be assembled for marketing without the lenses in the following manner or in any way found most convenient. For example, the temple may be placed in position with its bearing 7 resting on the cut-out portion of the lower end-piece 5, after which the plate or shim 25 is placed thereacross as shown in Fig. 5. The screw 20 is then inserted through the hole 29 in the shim 25 and screwed down into the threaded hole 24 in the end-piece 5. The screw 20 is set up to tighten the shim 25 against the top of the bearing 7 of the temple 6 to prevent play or looseness in the joint. The two ends of the split rim 2 are then sprung together and the end-pieces joined by inserting the screw 14 and screwing it down into the threaded hole 18 in the lower end-piece 5. As the two end-pieces 4 and 5 are placed in juxtaposition the head of the screw 20 will enter the hole 23 in the upper end-piece 4 and when the screw 14 is tightened in place its head will be enclosed in the hole 16 of the upper end-piece. In this way a smooth, flush joint is effected with no projections or sharp corners liable to scratch the face or injure the hands of the wearer.

In fitting the lenses to the spectacles the screws 14 are loosened or removed and the rims 2 sprung apart for insertion of the peripheral edges of the lenses within the grooves 8 of the rims. The ends of the rims may then be sprung together and the end-pieces secured in juxtaposition by the screws 14. It is thus possible to tighten the rims against the edges of the lenses with the required tension without in any way affecting the joint of the temple 6 with its mounting. That is to say, the screw 20 remains set up against the shim 25 to hold the bearing 7 snugly against the lower end-piece 5. Due to this arrangement the shim 25 functions in the nature of a washer to prevent the screw 20 from becoming loosened or unscrewed by repeated swiveling of the temple in its mounting. Should the temple screw 20 become loosened from abuse or after long use it may be readily tightened without in any way disturbing the adjustment of the rim on the lens, the end-piece connection being held fast by the screw 14.

It is also to be noted that it is unnecessary that the two end-pieces 4 and 5 be drawn together into close abutting relationship or with the upper end-piece 4 in contact with the shim 25. While it is preferable that the parts be thus closely connected, if the lens should be of slightly greater diameter than intended the rim can be tightened thereon with the proper tension without entirely closing the joint between the end-pieces, thereby avoiding the danger of cracking or breaking the glass. On the other hand, should the lens have a diameter less than prescribed the upper end-piece may be filed off on its under side to provide for proper tightening of the rim when the screw 14 is screwed down into the lower end-piece 5.

It has been stated that the lenses can be fitted to the rims of the spectacles without disturbing the mountings for the temples 6 and, likewise, the temples may be removed to be replaced by others without dislocating the joints at the ends of the rims 2 to disturb the lens mounting. All that is necessary for this purpose is to remove the screws 20 whereby the temples 6 will be released from connection with the end-pieces 5.

It will be observed from the foregoing that the present invention provides a particularly simple yet efficient device for attaching the rims of the spectacle frames to the lenses and for hingedly connecting the temples to provide for their removal without disturbing the lens mounting. The improved device also provides for greater convenience in fitting the lenses to the spectacles while insuring a secure connection therebetween. The defect of "drop temple" is obviated by use of the present device since the temples are always held in snug connection with their mountings without dependence on the clamping or securing means for the split rims of the spectacle frame.

As another advantage the present mounting is adapted to take standard types and sizes of temples without alteration therein, slight variations in the thickness of the temple head or bearing end due to tolerances in manufacture being compensated for by the flexibility of the shim 25.

In addition, the present improved device is capable of being manufactured at low cost, presents a neat and finished appearance and is efficient and durable in use over long periods.

While the invention is herein shown and described as embodied in a preferred form of construction, various modifications may be made in the form and arrangement of its parts without departing from the spirit or scope of the invention. Therefore, without limiting myself in this respect, I claim:

In an ophthalmic mounting for spectacles, the combination with the split rim of a spectacle frame, of end-pieces thereon for connecting the ends of the rim, each of said end-pieces having stepped parallel faces offset in different planes with a shoulder therebetween, said end-pieces cooperating to provide a slot-like opening, a shim having laterally-extending end portions offset in different planes for abutting engagement with the parallel stepped faces of one of the end-pieces, a temple having an end lying wholly between the shim and opposite end-piece, a screw passing through one end-piece and through the shim and screwed into the other end-piece to draw the ends of the rim together to bind it against the periphery of the lens, and a second screw extending through a hole in the shim and a hole in the end of the temple and screwed into the opposite end-piece to pivotally connect the temple therewith, the end-piece abutting the shim being provided with an opening for receiving the head of the pivot screw whereby the temple is held between the shim and opposite end-piece so that it may be released by withdrawing the screw through the opening without disconnecting the end-pieces.

LAURENCE C. MARTIN.